United States Patent
Kim et al.

(10) Patent No.: US 9,529,399 B2
(45) Date of Patent: Dec. 27, 2016

(54) LAUNDRY TREATING APPARATUS

(71) Applicant: LG ELECTRONICS INC., Seoul (KR)

(72) Inventors: Jeonghan Kim, Gyeongnam (KR); Sangwoo Jo, Gyeongnam (KR); Woonghyun Lee, Gyeongnam (KR)

(73) Assignee: LG ELECTRONICS INC., Seoul (KR)

( * ) Notice: Subject to any disclaimer, the term of this patent is extended or adjusted under 35 U.S.C. 154(b) by 78 days.

(21) Appl. No.: 14/014,529

(22) Filed: Aug. 30, 2013

(65) Prior Publication Data

US 2014/0075215 A1  Mar. 13, 2014

(30) Foreign Application Priority Data

Sep. 13, 2012  (KR) .................. 10-2012-0101598

(51) Int. Cl.
| | |
|---|---|
| *G06F 1/26* | (2006.01) |
| *D06F 33/02* | (2006.01) |
| *D06F 39/00* | (2006.01) |
| *H02J 9/00* | (2006.01) |

(52) U.S. Cl.
CPC .............. *G06F 1/26* (2013.01); *D06F 33/02* (2013.01); *D06F 39/005* (2013.01); *H02J 9/005* (2013.01); *D06F 2210/00* (2013.01); *D06F 2216/00* (2013.01)

(58) Field of Classification Search
CPC ............ D06F 13/02; D06F 33/02; D06F 1/26
See application file for complete search history.

(56) References Cited

U.S. PATENT DOCUMENTS

| | | | | |
|---|---|---|---|---|
| 6,304,976 B1* | 10/2001 | Kim | .......................... | G06F 1/30 713/300 |
| 8,130,510 B2* | 3/2012 | Jang | .......................... | H05K 1/14 134/56 R |
| 2003/0025395 A1* | 2/2003 | Peterson | ......................... | 307/11 |
| 2004/0135569 A1* | 7/2004 | Yun | ........................ | G06F 1/3218 323/355 |
| 2008/0225016 A1* | 9/2008 | Lee | ........................ | D06F 39/005 345/174 |
| 2011/0260553 A1* | 10/2011 | Poyner | ................. | A47L 15/0049 307/115 |
| 2012/0023679 A1* | 2/2012 | Hettinger et al. | ................ | 8/137 |

FOREIGN PATENT DOCUMENTS

| | | |
|---|---|---|
| CN | 101161911 A | 4/2008 |
| CN | 201546062 U | 8/2010 |
| EP | 1137151 A1 | 9/2001 |
| WO | 2007/043818 A1 | 4/2007 |
| WO | 2010/133518 A1 | 11/2010 |
| WO | WO 2010133518 A1 * | 11/2010 |

* cited by examiner

Primary Examiner — Jason Ko
Assistant Examiner — Cristi Tate-Sims
(74) Attorney, Agent, or Firm — Dentons US LLP

(57) ABSTRACT

The present invention provides a laundry treating apparatus including a cabinet, a control panel having a power key and a display panel provided to one side of the cabinet, a display MICOM for controlling a frame to be displayed on a display of the display panel, a main MICOM for putting a load into operation according to a washing stroke applied thereto, and a standby power MICOM for generating a power supply signal to supply power to the display MICOM and the main MICOM in response to a power key applied signal generated as the power key is operated.

14 Claims, 5 Drawing Sheets

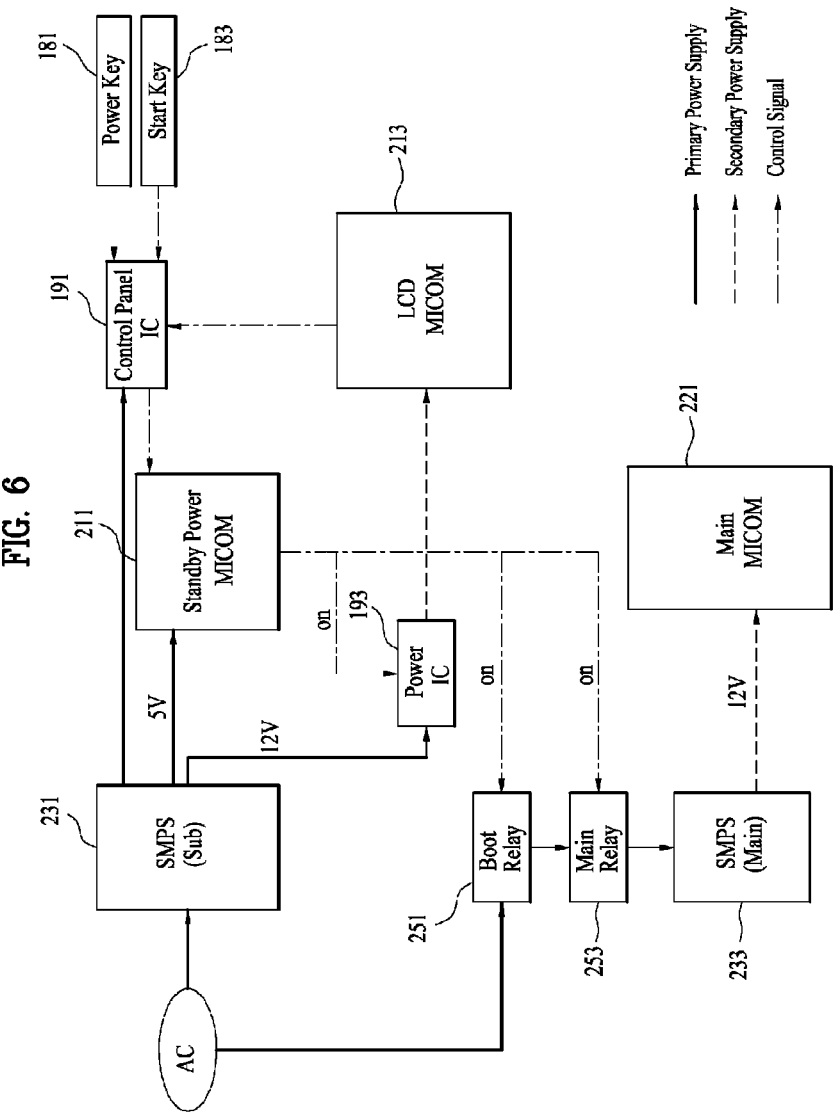

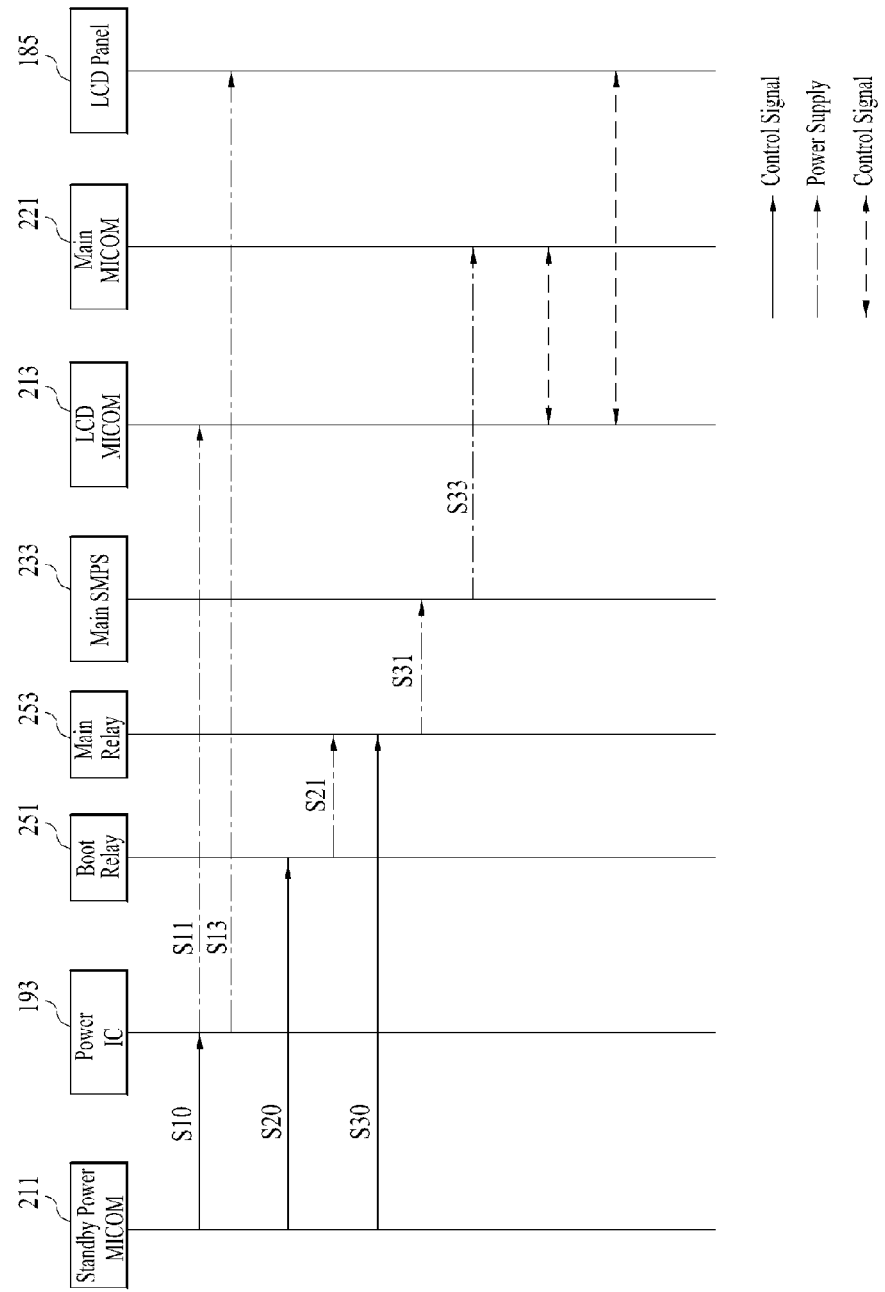

LAUNDRY TREATING APPARATUS

CROSS REFERENCE TO RELATED APPLICATION

Pursuant to 35 U.S.C. §119(a), this application claims the benefit of the Patent Korean Application No. 10-2012-0101598, filed on Sep. 13, 2012, which is hereby incorporated by reference as if fully set forth herein.

BACKGROUND OF THE DISCLOSURE

Field of the Disclosure

The present invention relates to a laundry treating apparatus, and more particularly, to a laundry treating apparatus for washing or drying a washing object, such as clothes.

Discussion of the Related Art

In general, as the laundry treating apparatus, a washing machine is typical one, and a dryer which dries the clothes may also be the laundry treating apparatus. Of course, a washing and drying machine which can wash and dry the clothes may also be the laundry treating apparatus.

Recently, refreshers which may also be called as the laundry treating apparatus are released, for refreshing the clothes, not by using water or washing, but by using heated air or steam.

Currently, the problem of global warming is on the rise, caused by use of fossil fuel and consequential increase of carbon dioxide and causes weather accidents at many places of the earth.

In order to prevent emission of the carbon dioxide which is pointed out as the cause of the global warming worldwide, development of a smart grid becomes an issue, for effective reduction of power used for power equipment. To meet such worldwide efficiency of the power equipment and power reduction, effective power reduction of the laundry treating apparatus is required.

In general, power is supplied to the laundry treating apparatus by connecting a power cord to a concent connected to an AC power source. In a state the power cord is connected to the concent, a predetermined rate of standby power is consumed even if the laundry treating apparatus is not in operation. Even though it is desirable to disconnects the power cord from the concent when the laundry treating apparatus is not in operation for preventing consumption of the standby power, there is a drawback of very big inconvenience of connecting/disconnecting the power cord to/from the concent every time the user uses the laundry treating apparatus. Accordingly, study on a scheme for reduction of the standby power consumed in a standby state in which the power cord of the laundry treating apparatus is connected to the concent.

SUMMARY OF THE DISCLOSURE

To solve the problems, an object of the present invention is to provide a laundry treating apparatus which can reduce standby power consumed in a standby state of the laundry treating apparatus.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a laundry treating apparatus includes a cabinet, a control panel having a power key and a display panel provided to one side of the cabinet, a display MICOM for controlling a frame to be displayed on a display of the display panel, a main MICOM for putting a load into operation according to a washing stroke applied thereto, and a standby power MICOM for generating a power supply signal to supply power to the display MICOM and the main MICOM in response to a power key applied signal generated as the power key is operated.

It is preferable that the control panel is a touch panel.

And, the laundry treating apparatus may further include a sub-SMPS for supplying power to the standby power MICOM.

And, the laundry treating apparatus may further include a main SMPS for supplying power to the main MICOM.

And, the laundry treating apparatus may further include a relay for receiving the power supply signal from the standby power MICOM and supplying power to the main SMPS in response to the power supply signal received thus.

In this case, the relay may include a boot relay and a main relay, wherein the boot relay supplies the power to the main relay in response to the power supply signal, and the main relay supplies the power to the main SMPS in response to the power supply signal.

And, the laundry treating apparatus may further include a power IC for receiving the power supply signal from the standby power MICOM, and supplying the power to the display MICOM in response to the power supply signal received thus.

In this case, the sub-SMPS may supply the power to the power IC.

Along with this, the power IC may supply the power to the display panel in response to the power supply signal.

And, in another aspect of the present invention, a laundry treating apparatus includes a cabinet, a control panel having a power key and a display panel provided to one side of the cabinet, a display MICOM for controlling a frame to be displayed on a display of the display panel, a main MICOM for putting a load into operation according to a washing stroke applied thereto, and a standby power MICOM for controlling to supply power to the display MICOM and the main MICOM, wherein, in a state the power is connected, and the power key is not applied, the power is supplied to the standby power MICOM, and no power is supplied to the display MICOM and the main MICOM.

Along with this, upon application of the power key, the standby power MICOM may control to supply power to the display MICOM and the main MICOM.

In this case, it is preferable that the control panel is a touch panel.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, illustrate embodiments of the invention and together with the description serve to explain the principle of the invention.

In the drawings:

FIG. 6 illustrates a block diagram of a power system of a laundry treating apparatus in accordance with a preferred embodiment of the present invention.

FIG. 7 illustrates a flow chart of a power supply process of a laundry treating apparatus in accordance with a preferred embodiment of the present invention.

DESCRIPTION OF SPECIFIC EMBODIMENTS

Reference will now be made in detail to the specific embodiments of the present invention, examples of which are illustrated in the accompanying drawings. Wherever possible, the same reference numbers will be used throughout the drawings to refer to the same or like parts.

A laundry treating apparatus described hereafter is a machine for drying or washing laundry including a dryer, a washing machine, and a washing machine having a drying function. Along with this, the laundry treating apparatus of the present invention is applicable both to a top loading type in which an introduction opening is provided to a top side of a cabinet through which the laundry is introduced to the laundry treating apparatus, and a front loading type in which the introduction opening is provided to a front (Or, a side) of the cabinet for introduction of the laundry to the laundry treating apparatus.

Though the laundry treating apparatus of the present invention is described with reference to the top loading type, it is evident that the laundry treating apparatus of the present invention is also applicable to the front loading type.

Figure 1:
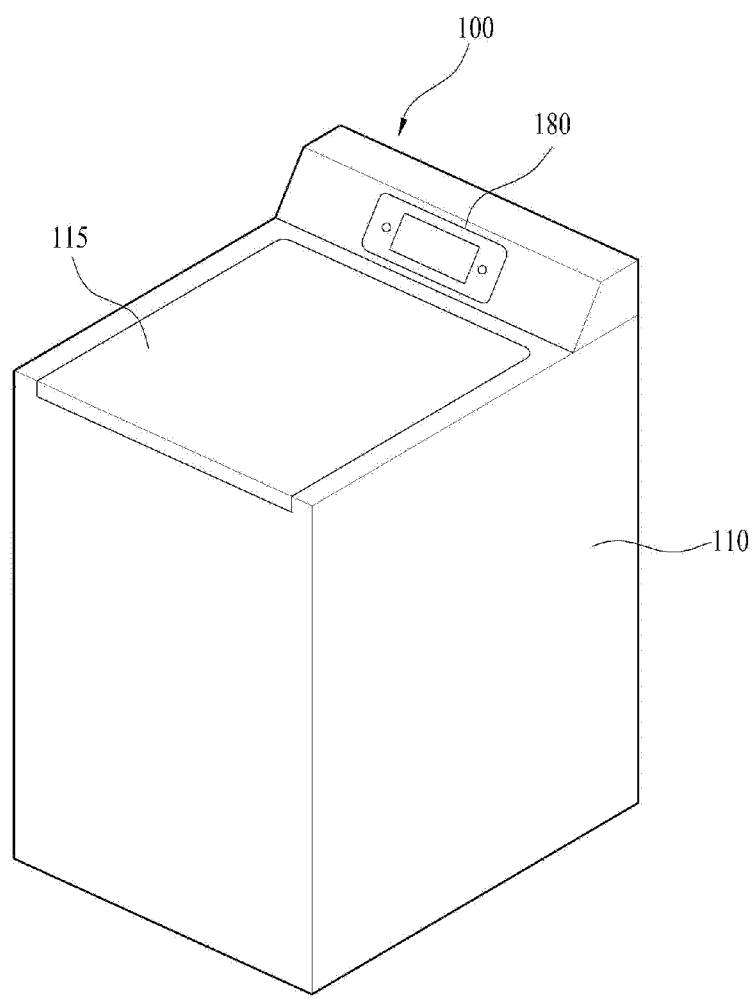
FIG. 1 illustrates a perspective view of an exterior appearance of a laundry treating apparatus in accordance with a preferred embodiment of the present invention.
Figure 2:
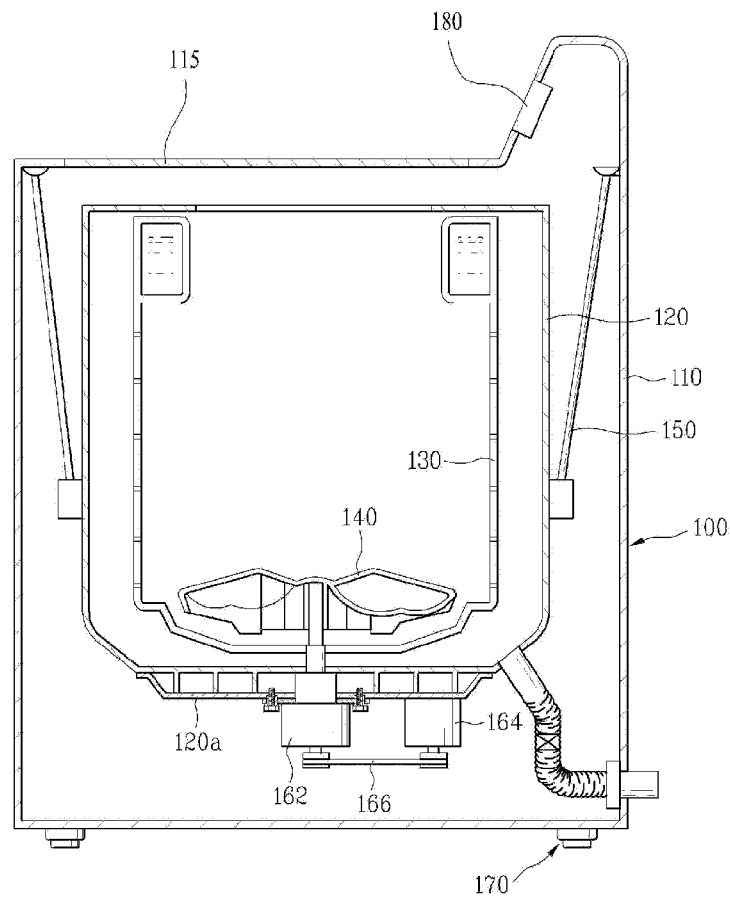
FIG. 2 illustrates a section of a laundry treating apparatus in accordance with a preferred embodiment of the present invention, schematically.

Referring to FIGS. 1 and 2, the laundry treating apparatus 100 in accordance with a preferred embodiment of the present invention may include a cabinet 110 which forms a body thereof. And, provided in the cabinet 110, there is a tub 120 for holding washing water. Along with this, rotatably provided in the tub 120, there is a drum 130 having a plurality of pass through holes formed therein. Rotatably mounted in the drum 130, there is a pulsator 140. And, the tub 120 is supported on the cabinet 110 by a suspension 150. The tub 120 has a bottom plate on an underside thereof coupled to a bracket which supports the clutch 162. And, mounted to a bottom of the tub 120, there are a drive motor 164 and the clutch 162 for having rotation force of the drive motor 162 forwarded thereto through a belt 166. And, the clutch 162 transmits the rotation force to the pulsator 140 and the drum 130, selectively.

The cabinet 110 has a laundry introduction opening (Not shown) in a top side thereof for introduction of the laundry therethrough. Along with this, the cabinet 110 also has a door 115 on the top side for opening/closing the laundry introduction opening. In the meantime, provided on one side of the cabinet 110, there is a control panel 180 for having control strokes of washing applied thereto. The control panel 180 may be provided to a front side or the top side of the cabinet 110. Provided to an underside of the cabinet 110, there are legs 170 for supporting the cabinet 110.

And, the laundry treating apparatus may include a control unit for controlling elements of the laundry treating apparatus. The control unit will be described, later.

The control unit will be described with reference to FIGS. 3 to 5.

The control unit includes the control panel 180 for having a control signal related to control of the laundry treating apparatus applied thereto from a user. The user may turn on/off power to the laundry treating apparatus, or input or start a washing stroke by using the control panel 180.

The control panel 180 may be provided to one side of the cabinet 110. The embodiment suggests providing the control panel 180 to the top side of the cabinet 110. However, a position of the control panel 180 is not limited to this, but it is natural that the control panel 180 may be provided to a front or a side of the cabinet 110.

The control panel 180 may include a display panel 185 for displaying a washing progress state, or the like. The display panel 185 may include a display for displaying a progress state of a washing stroke, or a frame of a selected course of the washing stroke, and a back light unit for directing a light to a back side of the display. And, the control panel 180 may include a power key 181 for applying power to the laundry treating apparatus, and a start key 183 for generating a control signal to make a washing course selected by the user to progress.

In the present invention, the control panel 180 may be a touch panel. That is, the power key 181, the start key 183, and the display provided to the control panel 180 are driven by a touch system. In this case, the control panel 180 may be driven in a constant voltage control. It is preferable that the display is a touch screen. The touch screen has a function for displaying the washing progress state, and is used as means for having the washing course or the like applied thereto from the user. The display may be LCD, OLED, or PDP, preferably, the LCD. If the display is the OLED, the back light unit may be omitted. Provided to one side of the control panel 180, there is a control panel IC 191 for supplying the power to the control panel 180. And, the control panel IC 191 has functions of receiving signal information applied from the display panel 185, the power key 181, or the start key 183, and forwarding the signal information received thus to a display MICOM 213 or a standby power MICOM 211 to be described later.

Figure 3:
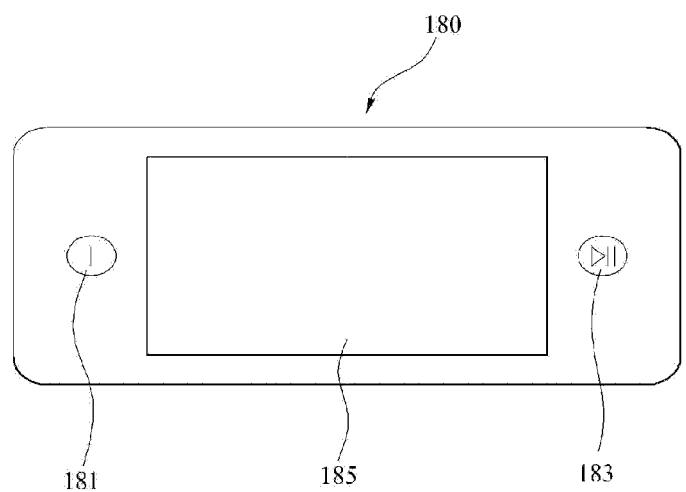
FIG. 3 illustrates a front view of a control panel in a laundry treating apparatus in accordance with a preferred embodiment of the present invention.

Referring to FIG. 3, the display panel 185 is provided to a center of the front of the control panel 180. Together with this, the power key 181 may be provided to one side of the display panel 185. And, the start key 183 may be provided to the other side of the display panel 185. It is apparent that arrangement of the display panel 185, the power key 181, and the start key 183 may vary with a manufacturing environment. The control panel 180 may be a touch panel. That is, the user can apply the control signal by touching the control panel 180 with a portion of a body thereof or a conductor. In this case, it is preferable that the control panel 180 is a constant voltage control touch panel. If the user presses the power key 181 down, a power key applied signal is generated. Together with this, in response to the power key applied signal, the standby power MICOM 211 generates a power supply signal.

Figure 4:
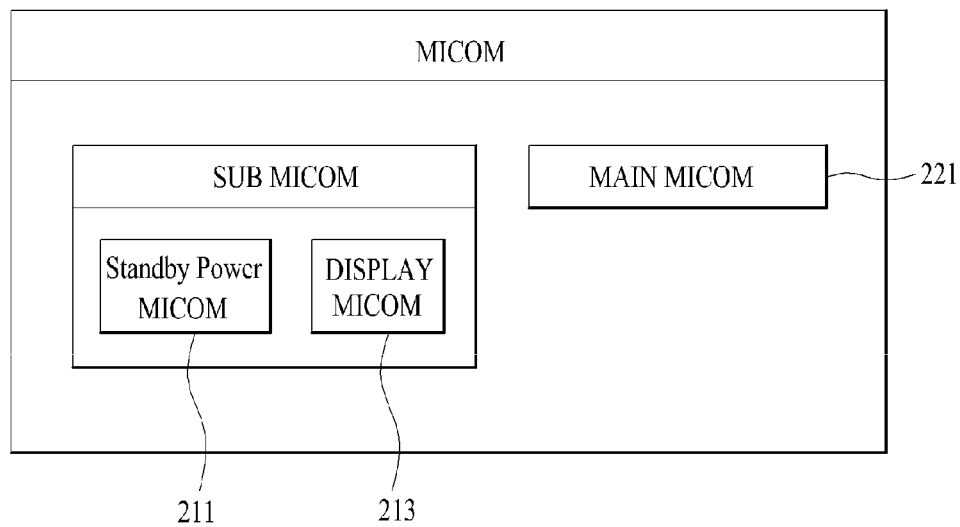
FIG. 4 illustrates a block diagram of a MICOM in a laundry treating apparatus in accordance with a preferred embodiment of the present invention.

Referring to FIG. 4, the control unit includes an MICOM (Micro Processor Computer) for controlling elements of the laundry treating apparatus, such as the drive motor, the display, and so on. In this case, the MICOM may be a controller processor, or a control program driven by the controller processor. In the meantime, the MICOM may include a sub-MICOM for controlling the display panel 185, and a main MICOM 221 for controlling loads, such as the drive motor and so on, according to the washing stroke applied thereto. According to the laundry treating apparatus of the present invention, the sub-MICOM may include the standby power MICOM 211 and the display MICOM 213. The standby power MICOM 211 controls standby power in a standby state of the laundry treating apparatus. Together with this, upon detecting user's application of the power key 181, the standby power MICOM 211 controls to supply power to the elements of the laundry treating apparatus. That is, the standby power MICOM 211 generates the power supply signal for supplying power to the display MICOM 213 and the main MICOM 221 in response to the power key applied signal which is generated as the power key 185 is operated. And, the display MICOM 213 puts an OS (Operating System) stored therein into operation, and displays a current state of the washing stroke, or the course of the washing stroke on the display of the display panel 185. The OS may be stored in an EEPROM, or an NAND Flash Memory on the PCB 281.

The display MICOM 213 is only in charge of input/output to/from the display. That is, the display MICOM 213 controls a frame to be displayed on the display of the display panel 185. The main MICOM 221 on the main PCB 281 controls operation related to the load on the laundry treating apparatus. The main PCB 281 transmits load and operation state information to a display PCB 285 periodically under the control of the main MICOM 221, and the display MICOM 213 displays the information received thus on the display.

Figure 5:
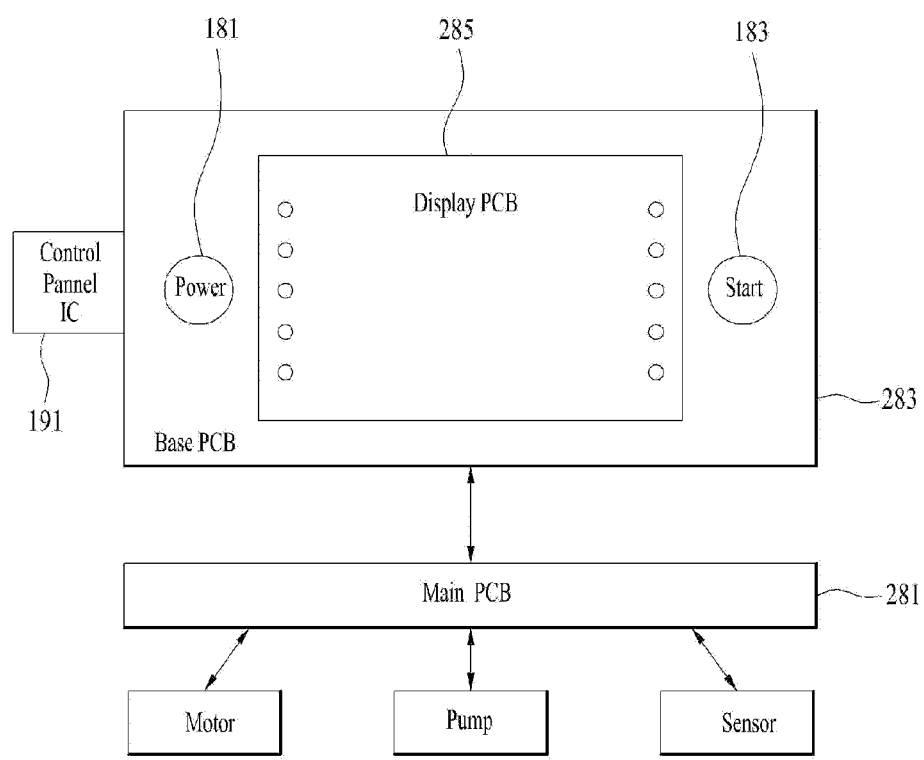
FIG. 5 illustrates a block diagram of a PCB structure, schematically.

Referring to FIG. 5, the standby power MICOM 211 and the display MICOM 213 are provided to a PCB mounted to a rear side of the control panel 180. In detail, the display MICOM 213 may be provided to the display PCB 285, and the standby power MICOM 211, the power key 181, and the start key 183 may be provided to a base PCB 283. The control panel IC 191 may be provided to one side of the base PCB 283. And, a power IC 193 may be provided to the display PCB 285. The power IC 193 serves to supply power to the display MICOM 213 in response to the power supply signal from the standby power MICOM 211. And, the power IC 193 may function to supply power to the back light unit of the display panel 185.

In the meantime, the main PCB 281 has the main MICOM 221 provided thereto. A control signal may be exchanged among the main PCB 281, the base PCB 283, and the display PCB, and the main PCB 281 may exchange a control signal with elements the main MICOM 221 controls.

Alike the present invention, if the display of the control panel 180 is configured to be a full touch screen, much standby power is required for standing by of the laundry treating apparatus until the laundry treating apparatus performs the washing stroke or the like. Therefore, the present invention suggests providing the standby power MICOM 211 which controls the standby power for reducing the standby power required, unnecessarily.

FIG. 6 illustrates a block diagram of a power system of a laundry treating apparatus in accordance with a preferred embodiment of the present invention schematically, and FIG. 7 illustrates a flow chart showing control signal transmission and power supply of the power system, schematically.

Referring to FIGS. 6 and 7, the laundry treating apparatus has an SMPS (Switching Mode Power Supply) for supplying power after converting AC to DC provided thereto. The SMPS may include a sub-SMPS 231 for supplying power to the standby power MICOM 211, and a main SMPS 233 for supplying power to the main MICOM 221. It is preferable that the sub-SMPS 231 and the main SMPS 233 are insulated, electrically. The sub-SMPS 231 and the main SMPS 233 may be provided on the main PCB 281. And, the laundry treating apparatus includes a relay for relaying the power to be supplied to the main SMPS 233. The relay receives a power supply signal from the standby power MICOM 211, and supplies the power to the main SMPS 233 in response to the power supply signal received thus. The relay may include a boot relay 251 and a main relay 253. The boot relay 251 is provided for protection of components on the main PCB 281, and operated for a predetermined time period before the main relay 253 which will be described later comes into operation. The boot relay 251 supplies the power to the main relay 253 in response to the power supply signal from the standby power MICOM 211, and the main relay 253 supplies the power to the main SMPS 233 in response to the power supply signal from the standby power MICOM 211. That is, the relays maintain a turned off state in a standby state, and is changed to a turn on state in response to the power supply signal from the standby power MICOM 211.

In a general standby state in which a power cord of the laundry treating apparatus is connected to a concent, the power is supplied to the sub-SMPS 231 and the boot relay 251. The standby state is a state in which the laundry treating apparatus has no control signal applied thereto from the user in a state the power cord of the laundry treating apparatus is connected to the concent, i.e., a state the power key 181 is not applied in a state the power cord is connected to the concent. In other words, the standby state is a state the laundry treating apparatus performs no washing stroke (Or, no drying stroke) in the state the power cord of the laundry treating apparatus is connected to the concent, i.e., a state only the power cord of the laundry treating apparatus is plugged in the concent. The power may be a utility AC power.

According to a preferred embodiment of the present invention, in the standby state, the power is supplied to the boot relay 251 and the sub-SMPS 231 at first. And, the sub-SMPS supplies the power to the power IC 193, the standby power MICOM 211, and the control panel IC 191. That is, in the standby state, the power is supplied to the sub-SMPS, the boot relay 251, the power IC 193, the standby power MICOM 211 and the control panel IC 191, primarily.

The sub-SMPS 231 converts an AC power supplied thereto thus into a DC power and supplies the same to the standby power MICOM 211. Also, the sub-SMPS 231 supplies the power supplied thereto thus to the control panel IC 191 and the power IC 193. The sub-SMPS 231 has the AC power supplied thereto, generates 5V and 12V DC power, and supplies the 5V power to the standby power MICOM 211, and the 12V power to the power IC 193.

In the meantime, the boot relay 251 having the power supplied thereto in the standby state maintains a turned off state without transmission of the power supplied thereto to other element to cut off the power to be supplied to the main SMPS 233 until the power supply signal is applied thereto from the standby power MICOM 211.

Thus, in the present invention, the power is not supplied to the display MICOM 213 and the main MICOM 221 in the standby state. Eventually, the laundry treating apparatus of the present invention has an advantage of reducing the standby power compared to the related art.

When the user presses down the power key 181 on the control panel 180 in the standby state, the power key 181 generates the power key applied signal and forwards the same to the control panel IC 191. Then, the control panel IC 191 forwards the power key applied signal to the standby power MICOM 211.

Referring to FIG. 7, upon reception of a power key applied signal, the standby power MICOM 211 forwards a power supply signal to the power IC 193 (S10). The standby power MICOM 211 also supplies the power supply signal to the boot relay 251 (S20). The power IC 193 supplies the power to the display MICOM 213 in response to the power supply signal (S11). Along with this, the power IC 193 supplies the power to the display panel 185 (S13). In this case, the power is also supplied to the back light unit of the display panel 185.

The boot relay 251 supplies the power to the main relay 253 in response to the power supply signal (S21). With a predetermined time period after forwarding the power supply signal to the boot relay 251, the standby power MICOM 211 forwards the power supply signal to the main relay 253 (S30). In this case, the predetermined time period may be 0.5 seconds. The main relay 253 having the power supplied thereto from the boot relay 251 supplies the power to the main SMPS 233 in response to the power supply signal from the standby power MICOM 211 (S31). Along with this, the main SMPS 233 supplies the power to the main MICOM 221 (S33).

In the meantime, the display MICOM 213 boots the OS stored therein when the display MICOM 213 has the power supplied thereto from the power IC 193. Until booting of the OS is finished, the display of the display panel 185 may have a booting image displayed thereon. Upon finishing the OS booting, the display displays a course selection frame having the washing or drying course applied thereto.

As has been described, the laundry treating apparatus of the present invention has an advantage of reducing the standby power consumed in the stand by state of the laundry treating apparatus.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A laundry treating apparatus comprising:
a cabinet;
a control panel located on the cabinet, the control panel including a display panel and a power key generating a power key applied signal by the user pressing the power key down during a standby state;
a main MICOM to apply an electrical load according to a washing stroke applied thereto;
a display MICOM to control the display panel;
a standby power MICOM to generate a power supply signal to control the supply of power to the display MICOM and the main MICOM in response to the power key applied signal from the power key;
a power IC receiving the power supply signal from the standby power MICOM, and supplying DC power to the display MICOM in response to the received power supply signal;
a sub-SMPS converting AC power to DC power and supplying DC power to the standby power MICOM and the power IC;
a main SMPS converting AC power to DC power and supplying DC power to the main MICOM; and
a relay receiving the power supply signal from the standby power MICOM and controlling the supply of AC power to the main-SMPS in response to the received power supply signal,
wherein the standby state is a state in which the power key applied signal is not generated by the power key and in which the standby power MICOM and the power IC is supplied DC power by the sub-SMPS, the relay is supplied AC power, and the main MICOM and the display MICOM are not supplied DC power.

2. The laundry treating apparatus of claim 1, wherein the control panel is a touch panel.

3. The laundry treating apparatus of claim 1, wherein the relay includes a boot relay and a main relay,
wherein the boot relay controls the supply of power to the main relay in response to the power supply signal, and the main relay controls the supply of power to the main SMPS in response to the power supply signal, and
wherein the power supply signal to the main relay is delayed relative to the power supply signal to the boot relay by a predetermined time period.

4. The laundry treating apparatus of claim 1, wherein the power IC supplies the power to the display panel in response to the received power supply signal.

5. The laundry treating apparatus of claim 1, wherein the control panel is located to one side of the cabinet.

6. The laundry treating apparatus of claim 1, wherein the control panel is located on a top side of the cabinet.

7. The laundry treating apparatus of claim 1, wherein the control further comprises a start key to signal a washing course selection from a user.

8. The laundry treating apparatus of claim 7, wherein the washing course selection comprises one or more washing strokes.

9. The laundry treating apparatus of claim 7, wherein the washing course selection at least partially defines the electrical load of the laundry treating apparatus.

10. The laundry treating apparatus of claim 1, wherein the main MICOM is provided on a main PCB.

11. The laundry treating apparatus of claim 1, wherein the display MICOM is provided to a display PCB.

12. The laundry treating apparatus of claim 1, wherein the standby power MICOM is provided on a base PCB.

13. The laundry treating apparatus of claim 1, wherein the sub-SMPS and the main-SMPS are electrically insulated.

14. The laundry treating apparatus of claim 10, wherein the sub-SMPS and the main-SMPS are provided on the main PCB.

* * * * *